Oct. 30, 1923.

R. E. WELCH 1,472,315

CUTTER FOR SLICED POTATOES

Filed Dec. 22, 1922

INVENTOR
Russell E. Welch
BY John A. Naismith
ATTORNEY

Patented Oct. 30, 1923.

1,472,315

UNITED STATES PATENT OFFICE.

RUSSELL E. WELCH, OF SAN JOSE, CALIFORNIA.

CUTTER FOR SLICED POTATOES.

Application filed December 22, 1922. Serial No. 608,570.

*To all whom it may concern:*

Be it known that I, RUSSELL E. WELCH, a citizen of the United States, and resident of San Jose, in the county of Santa Clara and State of California, have invented a certain new and useful Improvement in Cutters for Sliced Potatoes, of which the following is a specification.

My invention relates to a device for cutting sliced potatoes into diamond shapes preparatory to frying the same in the making of potato chips.

It is an object of my invention to provide a device of the character indicated which takes the raw sliced potato and by a rotary motion cuts slices of diamond shape.

It is another object of my invention to provide a machine for the work indicated which automatically strips the knives used for cutting of the cut chips and deposits the same in a suitable receptacle.

Yet a further object of my invention is to provide a device of the character indicated which is simple in construction and operation and one that is highly efficient in its practical application.

In the drawings—

Figure 1:
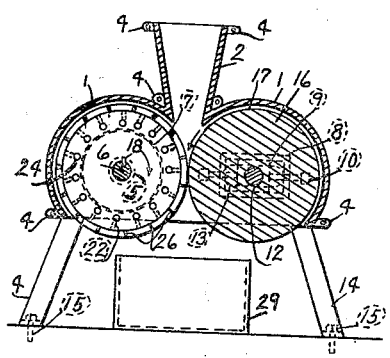
Figure 1 is a sectional elevation of my improved cutting machine taken on line 1—1 of Figure 2.
Figure 2:
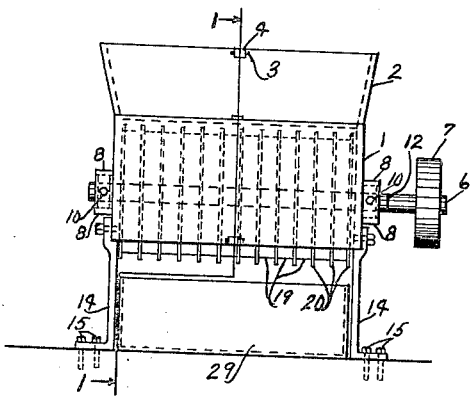
Figure 2 is an end elevation of the said machine.
Figure 3:
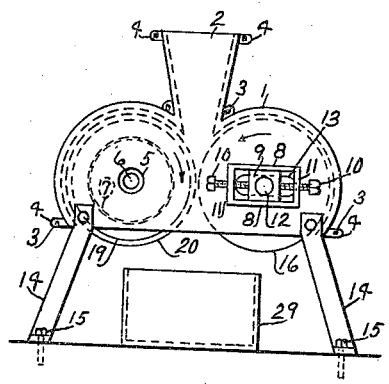
Figure 3 is a side elevation of the same showing the idler roller adjusting means.
Figure 6:
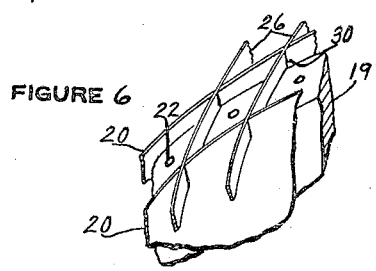
Figure 6 is a perspective view of a portion of the knife drum, parts broken away.
Figure 5:
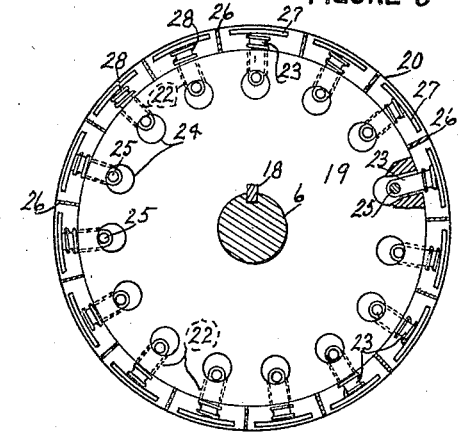
Figure 5 is an enlarged end elevation of one of the cutting wheels, parts being broken away.
Figure 4:
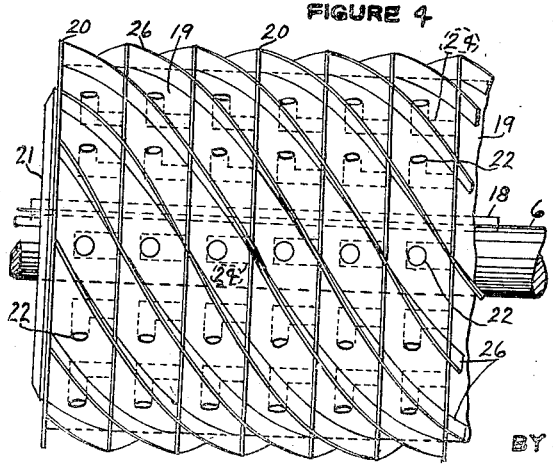
Figure 4 is an enlarged side elevation of the cutting drum, parts being broken away.

Referring more particularly to the drawings I show at 1 the casing of my cutting machine having a hopper 2 formed thereon. The said casing is formed of two halves bolted together by means of lugs 3 and bolts 4 as shown. Formed integrally on each side of one half of casing 1 are shaft bearings 5 through which shaft 6 passes and upon which driving pulley 7 is mounted.

Upon the other end of casing 1 and on the same horizontal plane as bearings 5 are formed guide members 8—8 in which bearing blocks 9 are slidably mounted. The sliding movement of said blocks are controlled by screws 10—10 threaded in end portions 11—11 of said guides 8—8 as shown, a shaft 12 passing through elongated slots 13 in casing 1 and through bearing blocks 9 as shown. The whole casing assembly is mounted upon supporting legs 14 secured by bolts 15 to a suitable support such as a floor.

Mounted upon shaft 12 and within casing 1 is an idler drum 16 which has a smooth external surface 17 as shown. The shaft 6 having the knife drum assembly rotatably mounted thereon by means of key 18 and is driven in the direction indicated by the arrow, by pulley 7. The idler drum 16 rotating in an opposite direction due to the frictional contact between the two. This contact being decreased or increased as desired by means of the adjusting screws 10—10 as above described.

The knife drum assembly consists of a series of annular discs 19 and thin annular discs 20 which form the knives of the device. One of the knife discs 20 is placed between each pair of adjoining discs 19 and the whole mounted upon shaft 6 and held in place by means of end pieces 21 and key 18 as shown. The diameter of the knife discs 20 are the same as the diameter of the idler drum 16 while the discs 19 have a lesser diameter as shown.

Equally spaced around the circumference of discs 19 and radially arranged therein are a series of orifices 22 in which are slidably mounted rods 23. At 24 are shown a second series of orifices formed so as to intersect the orifices 22 at right angles thereto, while at 25 are pins secured to the inner ends of rods 23 to form stops for said rods thus limiting the sliding movement of the said rods in their orifices 22.

At 26 are shown a series of cross knives placed diagonally across the surface of the drum assembly so as to come between the several orifices as shown. These knives passing through slots as 30 formed in the circular knives 20 as shown. This construction forming diamond shaped cutting edges with a single rod 23 in the center thereof. Mounted upon the outer end of rods 23 are diamond shaped plates 27. Springs 28 are placed between each plate 27 and the outer circumference of discs 19 as shown. The said springs holding the rods and plates 27 in an extended position with the outer surface of said plates slightly below the outer edge of the knives as shown. The pins 25 holding them in this position by their contact with orifices 24.

After the knife assembly drum has been placed upon the shaft 6 the outer surface of the knives are ground to form perfect edges at the joints where the several knives cross each other.

In operation the knife assembly drum is driven by pulley 7 and the idler drum is driven in the opposite direction by frictional contact with the outer surface of the knives. The slices of raw potatoes are fed into the mouth of hopper 2 from a slicing machine, not shown, and due to the form of the hopper fall directly between the revolving discs where the knives cut the slices into diamond shaped pieces. In this operation the slices of potatoes are forced against the plates 27 which are forced back against the pressure of springs 28. These same springs forcing the plates 27 and the diamond-shaped slices out of engagement with the knives as they pass the point of contact of the idler drum. The slices dropping into a suitable tub as 29 placed under the machine as shown.

The size and form of the hopper is such that a slice of raw potato must fall between the drums as the slices come from the slicing machine singly and drop directly into the hopper.

Thus it is seen that I have provided a cutting machine of the character indicated which is simple in construction and operation, entirely automatic in the discharge of the diamond cut slices and one that is highly efficient in its practical application.

It is to be understood, of course, that while I have herein shown and described the preferred embodiment of my invention, that changes may be made in form, proportions, method of construction and operation within the scope of the appended claims.

I claim:—

1. In a device of the character indicated, a drum, a plurality of laterally spaced knives concentrically arranged thereon, and a plurality of laterally spaced knives arranged to intersect said first mentioned knives with their cutting edges lying in the same cylindrical surface, a closure for the inner end of each pocket formed by said intersecting knives, and a ejector element resiliently mounted on each of said closures.

2. In a device of the character indicated, a drum, radially directed knives arranged thereon, ejector elements resiliently and slidably mounted thereon between said knives, a pressure drum mounted to contact with said knives whereby to depress said ejector elements upon passage of material therebetween, means for rotating said drums in opposite directions, and means for feeding sliced material between said drums.

3. In a device of the character indicated, a drum, a plurality of laterally spaced knives concentrically arranged thereon, and a plurality of laterally spaced knives arranged to intersect said first mentioned knives with their cutting edges lying in the same cylindrical surface and an independently operating ejector element mounted in each of the pockets formed by said intersecting knives.

4. In a device of the character indicated, a plurality of alternately arranged annular knives and discs having a common axis and mounted as an integral whole, the knives having uniformly greater circumferences than the discs, and a plurality of laterally spaced knives arranged to intersect said annular knives with their cutting edges in the same cylindrical surface.

5. In a device of the character indicated, a plurality of alternately arranged annular knives and discs having a common axis and mounted as an integral whole, the knives having uniformly greater circumferences than the discs, and a plurality of laterally spaced knives arranged to intersect said annular knives with their cutting edges in the same cylindrical surface, and an ejector element mounted in each pocket formed by said intersecting knives.

6. In a device of the character indicated, a plurality of alternately arranged annular knives and discs having a common axis and mounted as an integral whole, the knives having uniformly greater circumferences than the discs, and a plurality of laterally spaced knives arranged to intersect said annular knives with their cutting edges in the same cylindrical surface, each disc having a plurality of radially arranged orifices formed in the perimeter thereof and an orifice arranged to intersect each radial orifice, a pin arranged in each radial orifice and a second pin engaging said first pin and the intersecting orifice, a head arranged on each of said first pins and disposed within the pocket formed by the intersecting adjacent knives, and a spring inserted between each head and the disc on which it is mounted.

RUSSELL E. WELCH.